United States Patent
Li

(10) Patent No.: US 10,673,256 B2
(45) Date of Patent: Jun. 2, 2020

(54) HUB

(71) Applicant: SIMPower Technology Inc., Taipei (TW)

(72) Inventor: Dong-Sheng Li, Taipei (TW)

(*) Notice: Subject to any disclaimer, the term of this patent is extended or adjusted under 35 U.S.C. 154(b) by 0 days.

(21) Appl. No.: 16/003,217

(22) Filed: Jun. 8, 2018

(65) Prior Publication Data

US 2018/0358821 A1 Dec. 13, 2018

Related U.S. Application Data

(60) Provisional application No. 62/516,685, filed on Jun. 8, 2017.

(51) Int. Cl.
| | |
|---|---|
| *H02J 7/00* | (2006.01) |
| *G06F 1/26* | (2006.01) |
| *G05B 19/042* | (2006.01) |
| *H01R 27/02* | (2006.01) |
| *H02J 7/02* | (2016.01) |
| *H02J 7/04* | (2006.01) |

(52) U.S. Cl.
CPC .......... *H02J 7/0021* (2013.01); *G05B 19/042* (2013.01); *G06F 1/266* (2013.01); *H01R 27/02* (2013.01); *H02J 7/0027* (2013.01); *H02J 7/022* (2013.01); *H02J 7/04* (2013.01); *G05B 2219/2639* (2013.01); *H02J 7/00* (2013.01)

(58) Field of Classification Search
CPC .. H02J 7/0021; H02J 7/04; H02J 7/022; H02J 2007/0062; H02J 7/0027; H02J 7/06; H02J 7/047; H02J 7/045; H01R 27/02; G05B 19/042; G05B 2219/2639; G06F 1/266

USPC .......................................................... 320/107
See application file for complete search history.

(56) References Cited

U.S. PATENT DOCUMENTS

| | | | |
|---|---|---|---|
| 10,199,940 B1* | 2/2019 | Bui | H01R 25/003 |
| 10,277,330 B2* | 4/2019 | Sipes, Jr. | H04N 21/4436 |
| 2003/0042303 A1* | 3/2003 | Tsikos | G06K 7/10594 |
| | | | 235/384 |
| 2011/0273144 A1 | 11/2011 | Yu et al. | |
| 2016/0097522 A1* | 4/2016 | Chien | H05B 47/105 |
| | | | 362/183 |
| 2016/0352101 A1* | 12/2016 | Koo | H02J 1/102 |

(Continued)

FOREIGN PATENT DOCUMENTS

| | | |
|---|---|---|
| EP | 3043442 | 7/2016 |
| TW | 534523 | 5/2003 |
| TW | 201418924 | 5/2014 |

*Primary Examiner* — M Baye Diao

(57) ABSTRACT

A hub is suitable for electrically connecting an electronic device, an AC power supply and at least one mobile device that are located outside the hub. The hub includes a power module, a USB connection terminal, a USB Type-C connection terminal, a power distribution control circuit, and a first PD controller. The power module is electrically connected to the AC power supply. The USB connection terminal is electrically connected to the power module and the mobile device. The USB Type-C connection terminal is electrically connected to the power module and the electronic device. Besides, the power distribution control circuit is electrically connected to the power module. The power distribution control circuit is used for measuring a measurement value of the power module. In addition, the first PD controller is connected between the USB Type-C connection terminal and the power distribution control circuit.

12 Claims, 5 Drawing Sheets

(56) References Cited

U.S. PATENT DOCUMENTS

| | | |
|---|---|---|
| 2017/0141608 A1 | 5/2017 | Molex |
| 2017/0185126 A1* | 6/2017 | Trethewey .............. G06F 1/266 |
| 2017/0293335 A1* | 10/2017 | Dunstan ................. H02M 1/08 |
| 2018/0131119 A1* | 5/2018 | Makwinski .......... H01R 9/2408 |
| 2018/0351405 A1* | 12/2018 | Zhou ...................... H02J 50/12 |

* cited by examiner

HUB

BACKGROUND OF THE INVENTION

Field of the Invention

The present invention relates to a hub, and more particularly to a hub having an automatic power distribution control circuit.

Description of Related Art

Nowadays, after a Type C hub receives external AC power, the power supply of the Type C hub first converts the AC power to DC power. The Type C hub distributes the DC power to an electronic device (such as, a notebook computer) and a mobile device (such as, a smart phone) at the same time. However, when the power of the power supply is not large enough, most of the power is provided to the notebook computer. As a result, the charging power of the smart phone is limited and the time required for charging the smart phone is prolonged (the small phone cannot enter the fast charge mode). At this time, even if the notebook computer has been fully charged, the smart phone will not change the charging mode. Or, even if the smart phone is fully charged, the notebook computer will not change the charging power. To meet both the fast charging mode of the smart phone and the charging power of the notebook computer, the Type C hub must use a high-power power supply. However, the size and cost of the power supply also increase.

Therefore, the person skilled in this field has to consider how to properly distribute the total output power of the Type C hub for all devices to be charged in turns in the shortest time.

SUMMARY OF THE INVENTION

In order to solve the above problem, the primary object of the present invention is to provide a hub. The hub can appropriately automatically distribute the total output power of the Type C hub.

The hub of the present invention is suitable for electrically connecting an electronic device, an AC power supply and at least one mobile device that are located outside the hub. The hub comprises a power module, a USB connection terminal, a USB Type-C connection terminal, a power distribution control circuit, and a first PD controller. The power module is electrically connected to the AC power supply. The USB connection terminal is electrically connected to the power module and the mobile device. The USB Type-C connection terminal is electrically connected to the power module and the electronic device. Besides, the power distribution control circuit is electrically connected to the power module. The power distribution control circuit is used for measuring a measurement value of the power module. In addition, the first PD controller is connected between the USB Type-C connection terminal and the power distribution control circuit. Wherein, when the measurement value is not less than a measurement upper limit value, the power distribution control circuit decreases a charging power of the electronic device via the first PD controller. Wherein, when the measurement value is less than a measurement lower limit value, the power distribution control circuit increases the charging power of the electronic device via the first PD controller.

In the above hub, the power module includes an AC/DC converter and a first DC/DC converter. The AC/DC converter is electrically connected to the first DC/DC converter and the USB Type-C connection terminal. The first DC/DC converter is electrically connected to the USB connection terminal.

In the above hub, the power module includes an AC/DC converter, a first DC/DC converter, and a second DC/DC converter. The AC/DC converter is electrically connected to the first DC/DC converter and second DC/DC converter. The first DC/DC converter is electrically connected to the USB connection terminal. The second DC/DC converter is electrically connected to the USB Type-C connection terminal.

In the above hub, when the electric power value is less than a measurement lower limit value, the power distribution control circuit increases the charging power of the electronic device via the first PD controller.

In the above hub, the hub is suitable for electrically connecting a DC power supply located outside the hub. The DC power supply is electrically connected to the first DC/DC converter and the second DC/DC converter.

In the above hub, the measurement value is an electric power value, a voltage value, a current value, or a temperature value.

In the above hub, when the measurement value is the electric power value, the measurement upper limit value is 60 W.

In the above hub, when the measurement value is the voltage value, the measurement upper limit value is 20V.

In the above hub, when the measurement value is the current value, the measurement upper limit value is 3 A.

In the above hub, when the measurement value is the temperature value, the measurement upper limit value is 75° C.

In the above hub, the hub further comprises a charging mode controller. The charging mode controller is connected between the USB connection terminal and the power distribution control circuit. Wherein, when the measurement value is not less than the measurement upper limit value, the power distribution control circuit decreases a charging power of the mobile device via the charging mode controller.

In the above hub, the hub further comprises a second PD controller. The second PD controller is connected between the USB connection terminal and the power distribution control circuit. Wherein, when the measurement value is not less than the measurement upper limit value, the power distribution control circuit decreases the charging power of the mobile device via the second PD controller.

DETAILED DESCRIPTION OF THE INVENTION

Embodiments of the present invention will now be described, by way of example only, with reference to the accompanying drawings.

Figure 1:
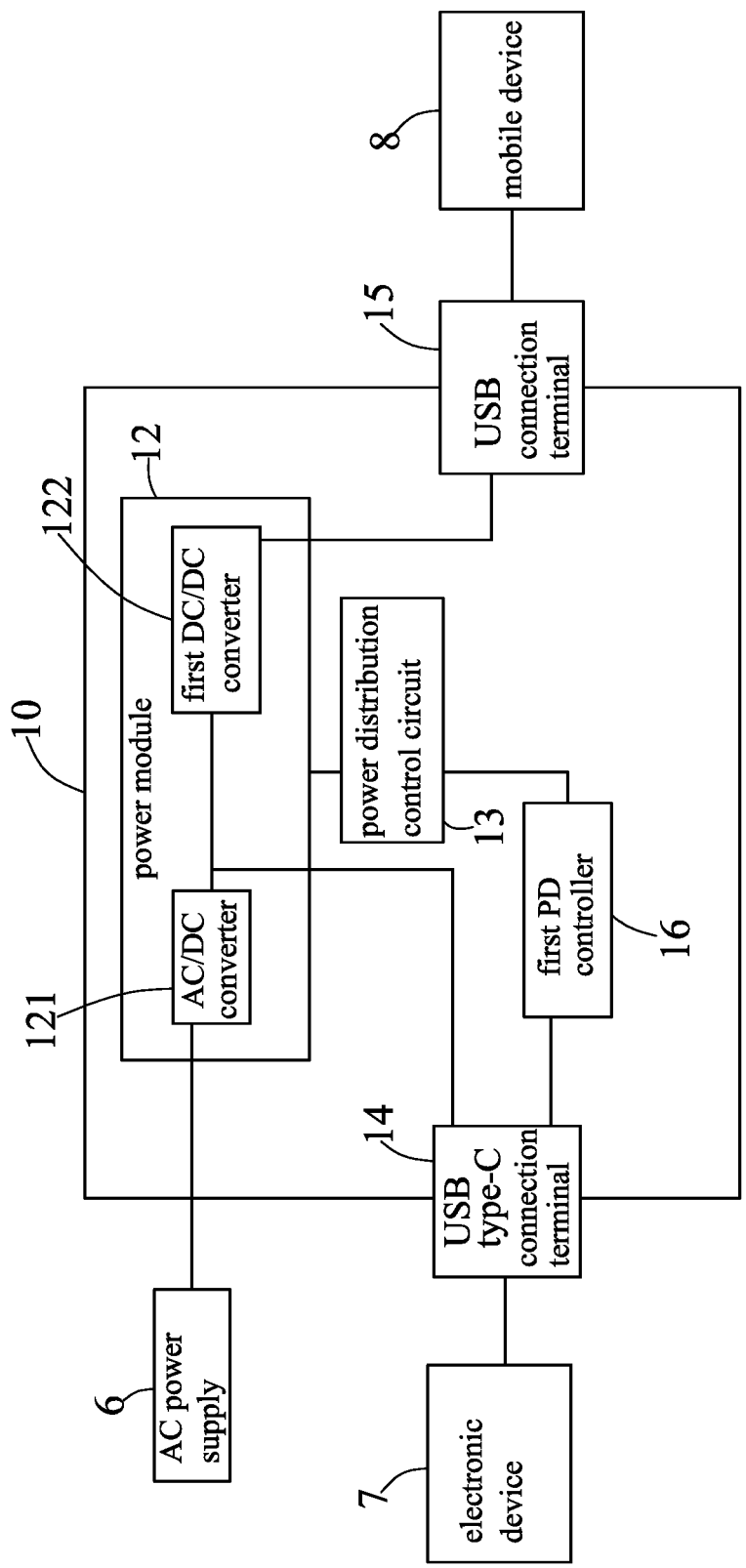
FIG. 1 is a schematic view of a hub 10 connected with an electronic device 7, an AC power supply 6 and a mobile device 8 according to a first embodiment of the present invention.

Please refer to FIG. 1. FIG. 1 is a schematic view of a hub 10 connected with an electronic device 7, an AC power supply 6 and a mobile device 8 according to a first embodiment of the present invention. The hub 10 is electrically connected to an electronic device 7, an AC power supply 6 and at least one mobile device 8 that are located outside the hub 10. The hub 10 includes a power module 12, a USB Type-C connection terminal 14, a USB connection terminal 15, a power distribution control circuit 13, and a first PD controller 16. The power module 12 includes an AC/DC converter 121 and a first DC/DC converter 122. The AC/DC converter 121 is electrically connected to the first DC/DC converter 122. Therefore, the power module 12 is a power supply. In addition, the power module 12 is electrically connected to the AC power supply 6 to receive AC power. Besides, the AC power is converted into DC power by the AC/DC converter 121, and the AC/DC converter 121 can increase or decrease the voltage of the DC power. Therefore, the converted DC power is suitable for the electronic device 7 with a different voltage. In addition, the USB connector 15 is electrically connected to the first DC/DC converter 122 of the power module 12 and the mobile device 8. Therefore, after the DC power converted by the AC/DC converter 121 is provided to the first DC/DC converter 122, the first DC/DC converter 122 supplies the DC power to the mobile device 8. The mobile device 8 is, for example, an intelligent phone, tablet computer, or notebook computer. In addition, the USB Type-C connection terminal 14 is electrically connected to the AC/DC converter 121 of the power module 12 and the electronic device 7, so that the DC power converted by the AC/DC converter 121 is provided to the electronic device 7. The electronic device 7 is, for example, a notebook computer.

Referring again to FIG. 1, the power distribution control circuit 13 is electrically connected to the power module 12. The first PD controller 16 is connected between the USB Type-C connection terminal 14 and the power distribution control circuit 13. The power distribution control circuit 13 is used for measuring a measurement value of the power module 12. The measurement value is, for example, an electric power value, a voltage value, a current value, or a temperature value. When the measurement value is not less than a measurement upper limit value, the power distribution control circuit 13 will decrease the charging power of the electronic device 7 via the first PD controller 16. For example, when only one smart phone is connected to the USB connection terminal, the power module 12 supplies 7.5 W of electric power to the smart phone, so the power distribution control circuit 13 measures the measurement value of 7.5 W. In addition, when the smart phone and the notebook computer are connected to the hub 10 at the same time, the power module 12 supplies 7.5 W of electric power to the smart phone and 60 W of electric power to the notebook computer, so the measurement value measured by the power distribution control circuit 13 is 67.5 W. However, if the power module 12 can only stably supply a total power of 60 W, the measurement upper limit value of the hub 10 will be set to 60 W (the measurement value at this time is not less than the measurement upper limit value). In this way, the power distribution control circuit 13 communicates with the first PD controller 16 and reduces the charging power of the electronic device 7 (for example, from 60 W to 50 W) by changing the charging current, so that the total power of the notebook computer and the smart phone is 57.5 W, less than the upper limit value of 60 W. As a result, the power module 12 can preferentially supply stable power to the smart phone. In addition, when the measurement value is less than a measurement lower limit value, the power distribution control circuit 13 will increase the charging power of the electronic device 7 via the first PD controller 16. For example, when the smart phone is gradually charged full, the total power gradually decreases from 57.5 W to 50 W (the lower limit value of the hub 10 is set to 52.5 W). The power distribution control circuit 13 communicates with the first PD controller 16 and increases the charging power of the electronic device 7 (from 50 W to 60 W) by changing the charging current until the notebook computer is gradually charged full, and the charging power gradually decreases from 60 W (at this time, even if the charging power is less than 50 W, the measurement upper limit value set by the first PD controller 16 is still 60 W). Compared with the conventional Type C hub, the hub 10 of this embodiment can appropriately distribute the electric power to the notebook computer (electronic device 7) and the smart phone (mobile device 8), so the charging power of the smart phone is not limited (can enter fast charge mode). Therefore, there is no need for the hub 10 to have a high-power power supply, so the manufacturing cost and size of the hub can be reduced.

In the above embodiment, the measurement value uses the electric power value as an example. However, other physical quantities can be used as the measurement value, such as temperature. For example, when the measurement value is a temperature value, the measurement upper limit value is usually set to a temperature of 75° C., so that the temperature of the hub 10 won't be too high. When the power module 12 has, for example, a measured temperature of 77° C. (which is greater than the measurement upper limit value), the power distribution control circuit 13 decreases the charging power of the electronic device 7 via the first PD controller 16. In this way, as the total charging power drops, the heat generated by the hub 10 also decreases, and the temperature of the hub 10 also decreases accordingly. On the contrary, when the temperature drops to the lower limit value, if the electronic device 7 is not fully charged at this time, the charging power is also increased. In addition, when the measurement value is a voltage value, the measurement upper limit value is usually set to a voltage value of 20V. When the measurement value is a current value, the measurement upper limit value is usually set to a current value of 3 A. The voltage value multiplied by the current value is the electric power value.

Figure 2:
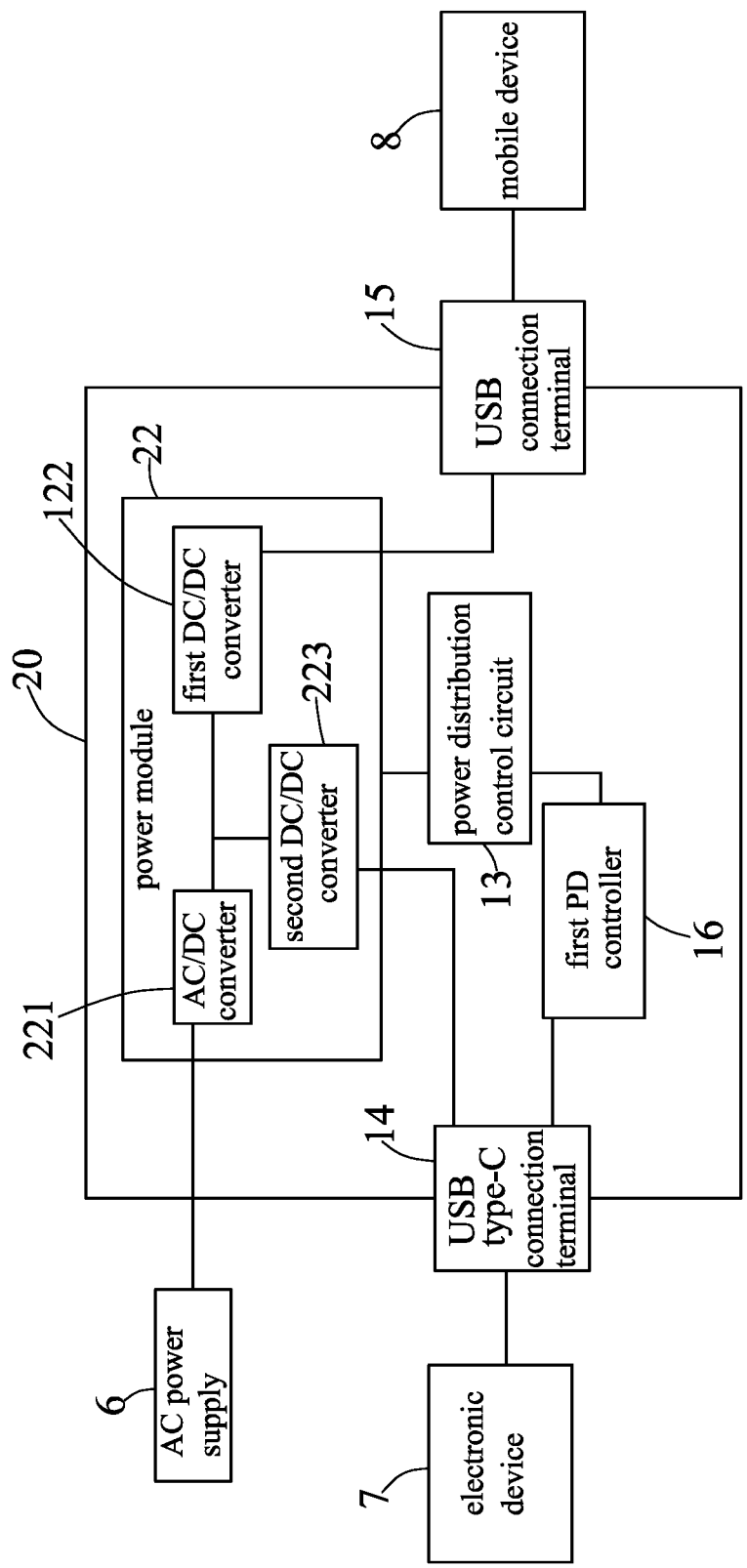
FIG. 2 is a schematic view of a hub 20 connected with external devices according to a second embodiment of the present invention.

Please refer to FIG. 2. FIG. 2 is a schematic view of a hub 20 connected with external devices according to a second embodiment of the present invention. The difference between the hub 20 and the hub 10 is described below. The power module 22 of the hub 20 further includes a second DC/DC converter 223. The AC/DC converter 221 is electrically connected to the first DC/DC converter 122 and the second DC/DC converter 223. The AC/DC converter 221 of the hub 20 cannot increase or decrease the voltage of the AC power and can only convert the AC power to DC power. In addition, the second DC/DC converter 223 is electrically connected to the USB Type-C connection terminal 14. The second DC/DC converter 223 is capable of increasing and decreasing the voltage of the DC power, which is advantageous for the electronic device 7 with a different voltage to receive the DC power. In this way, after the DC power converted by the AC/DC converter 121 is provided to the second DC/DC converter 223, the second DC/DC converter 223 adjusts the voltage of the DC power again. After that, the DC power is then provided to the electronic device 7 again.

Figure 3:
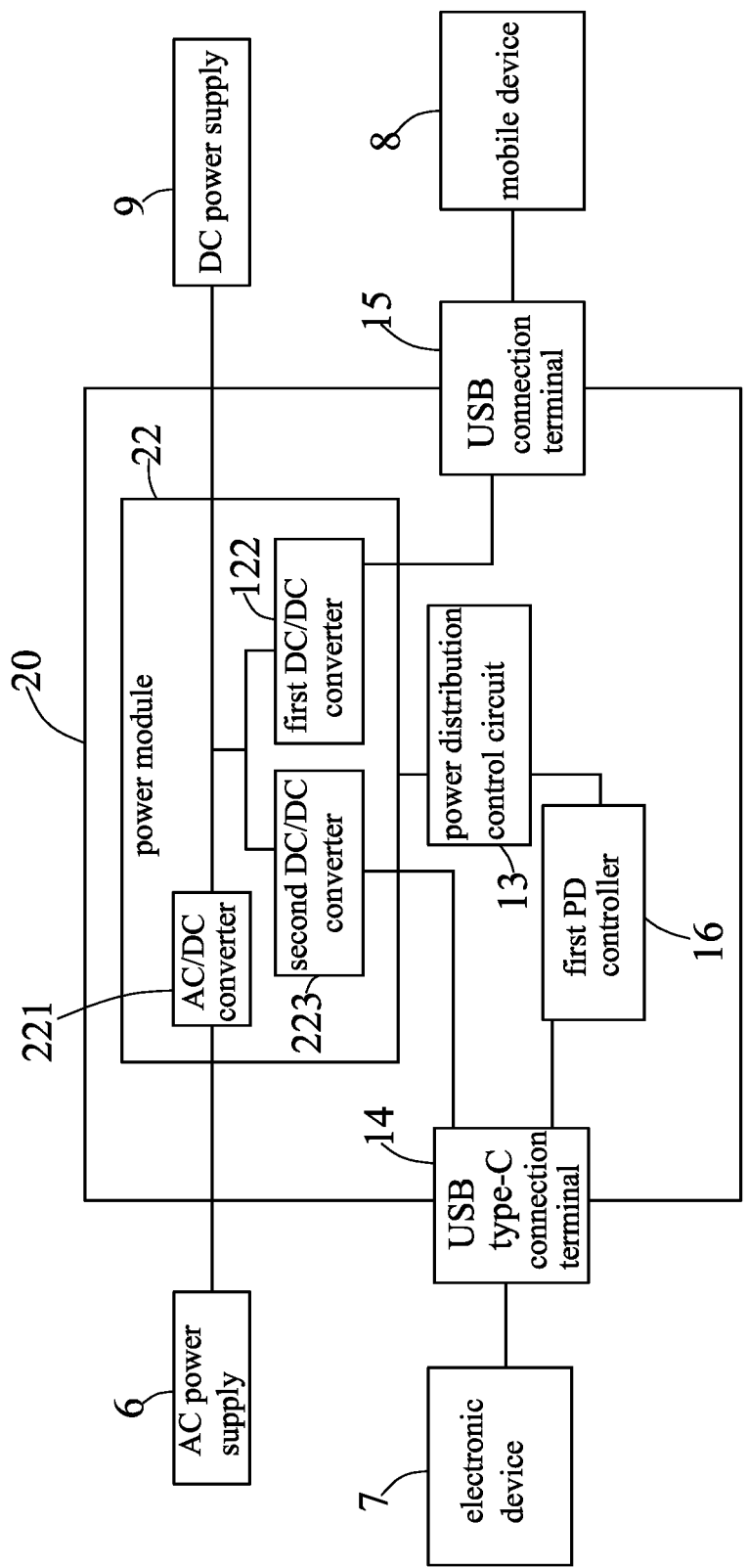
FIG. 3 is a schematic view of the hub 20 connected with the external devices and a DC power supply 9.

Please refer to FIG. 3. FIG. 3 is a schematic view of the hub 20 connected with the external devices and a DC power supply 9. The hub 20 is further electrically connected to a DC power supply 9. The DC power supply 9 may be a car voltage source or a voltage source from a wireless charging receiving circuit. In detail, the DC power supply 9 is electrically connected to the first DC/DC converter 122 and the second DC/DC converter 223, so the first DC/DC converter 122 and the second DC/DC converter 223 can directly receive the power from the DC power supply 9. In this way, the hub 20 has an additional stable power supply.

Figure 4:
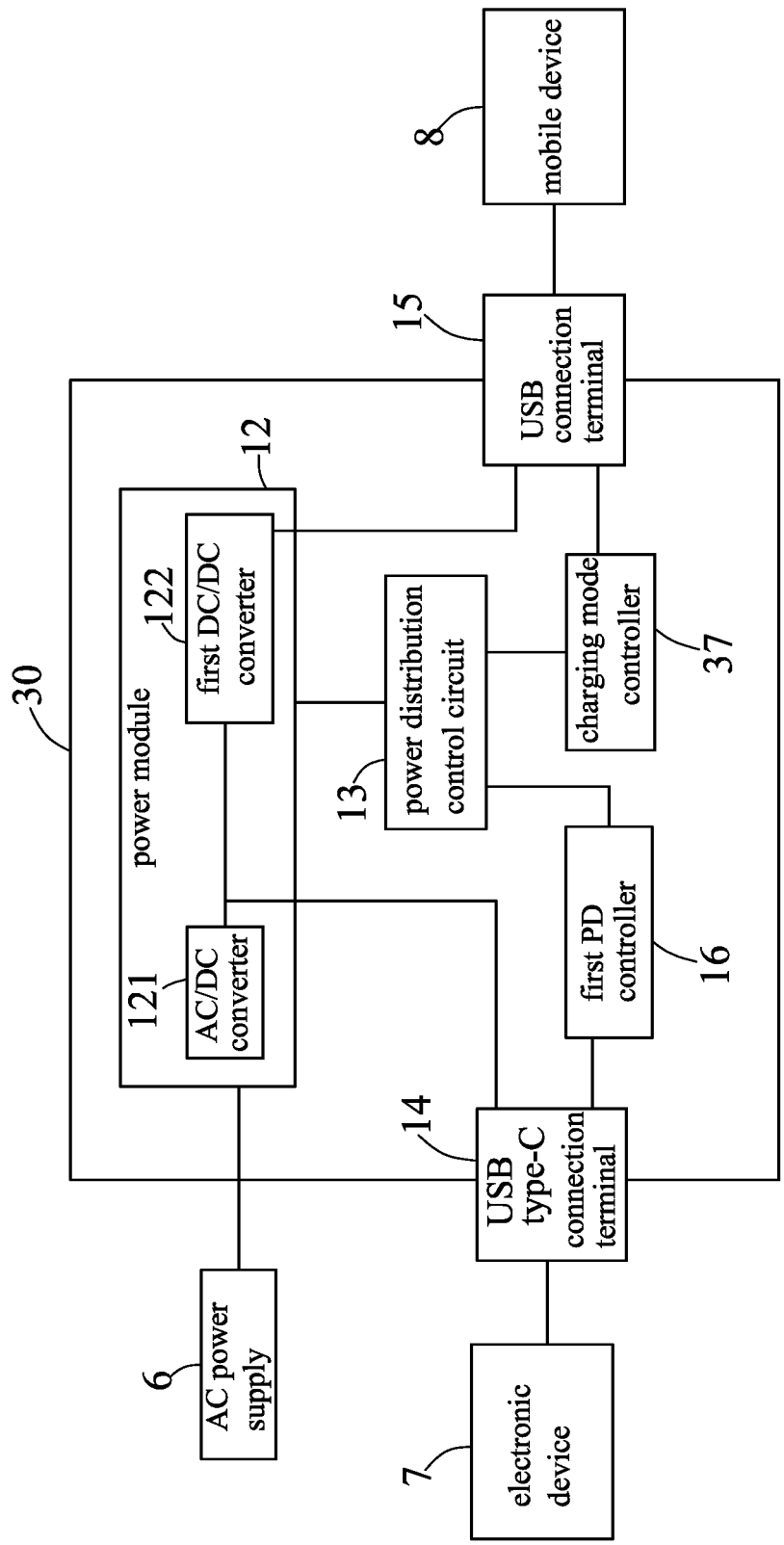
FIG. 4 is a schematic view of a hub 30 connected with external devices according to a third embodiment of the present invention.

Please refer to FIG. 4. FIG. 4 is a schematic view of a hub 30 connected with external devices according to a third embodiment of the present invention. The difference between the hub 30 and the hub 10 is described below. The hub 30 further includes a charging mode controller 37. The charging mode controller 37 is connected between the USB connection terminal 15 and the power distribution control circuit 13. Wherein, when the measurement value is not less than the measurement upper limit value, the power distribution control circuit 13 will decrease the charging power of the mobile device 8 via the charging mode controller 37. Specifically, the power distribution control circuit 13 communicates with the charging mode controller 37 and decreases the charging power of the mobile device 8 by changing the charging current so that the total power of the electronic device 7 and the mobile device 8 is less than the measurement upper limit value. Therefore, in addition to the hub 30 being able to decrease the charging power of the electronic device 7 via the first PD controller 16, the hub 30 can decrease the charging power of the mobile device 8 via the charging mode controller 37, such that the hub 30 can more appropriately distribute the electric power to the electronic device 7 and the mobile device 8.

Figure 5:
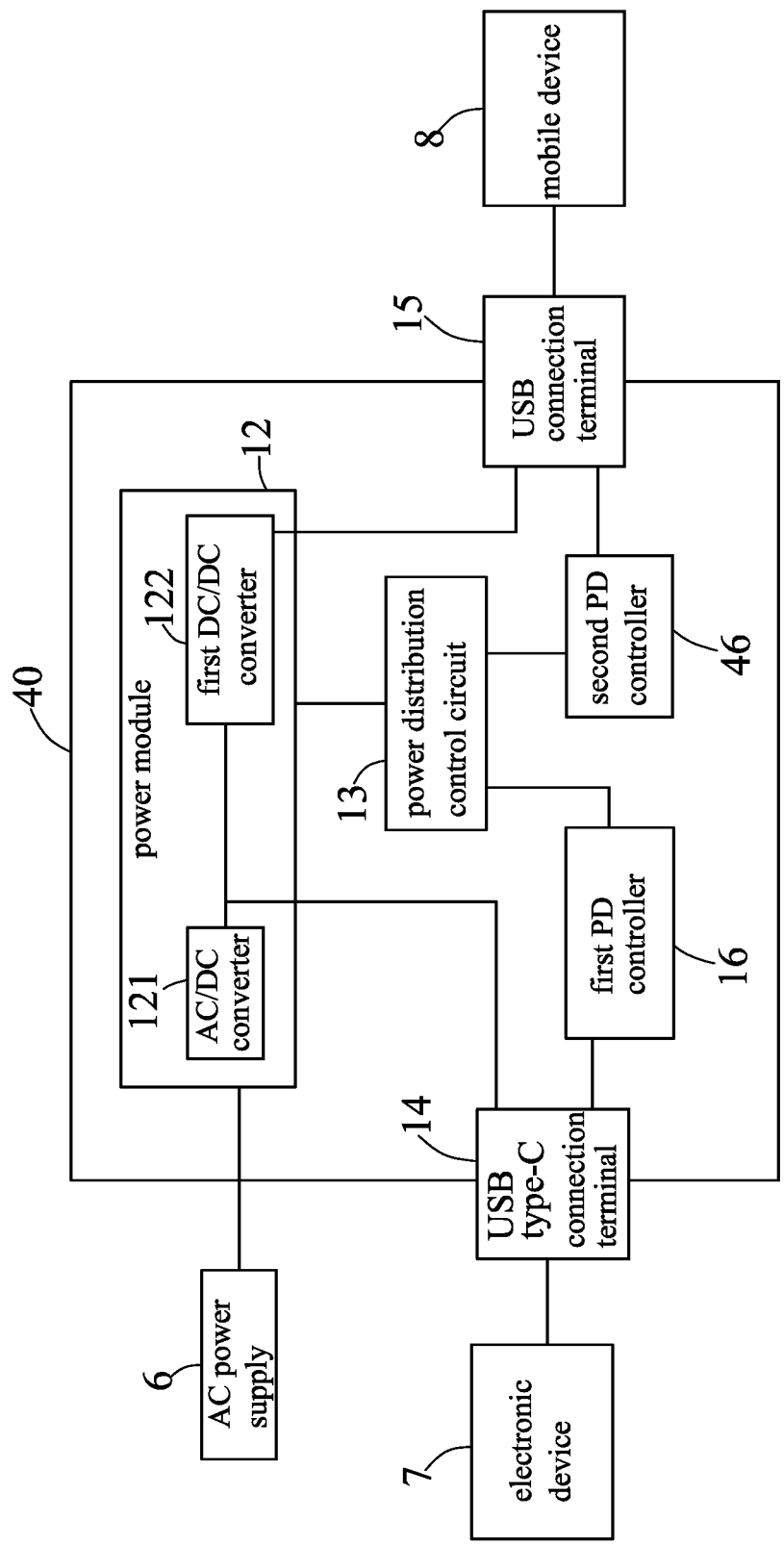
FIG. 5 is a schematic view of a hub 40 connected with external devices according to a fourth embodiment of the present invention.

Please refer to FIG. 5. FIG. 5 is a schematic view of a hub 40 connected with external devices according to a fourth embodiment of the present invention. The difference between the hub 40 and the hub 10 is described below. The hub 40 further includes a second PD controller 46. The second PD controller 46 is connected between the USB connection terminal 15 and the power distribution control circuit 13. Wherein, when the measurement value is not less than the measurement upper limit value, the power distribution control circuit 13 will decrease the charging power of the mobile device 8 via the second PD controller 46. In detail, the power distribution control circuit 13 communicates with the second PD controller 46 and decreases the charging power of the mobile device 8 by changing the charging current, so that the total power of the electric device 7 and the mobile device 8 is less than the measurement upper limit value. Therefore, in addition to the hub 40 being able to adjust the charging power of the electronic device 7 via the first PD controller 16, the hub 40 can decrease the charging power of the mobile device 8 via the second PD controller 46. Wherein, although both the second PD controller 46 and the charging mode controller 37 can decrease the charging power of the mobile device 8, the second PD controller 46 has finer and more flexible control of the charging power (such as controlling the charging voltage level of the mobile device 8, and having a measurement lower limit value detection, or determining whether the electronic device 7 has been charged fully through communication with the first PD controller, thereby improving the charging power of the mobile device 8.). At the same time, the second PD controller 46 may issue instructions to request the mobile device 8 to perform digital signal transmission. Therefore, the electronic device 7 and the mobile device 8 can perform dynamic distribution of the charging mode without exceeding the upper limit value according to different attributes and communication results such as the remaining battery level of each device itself or an acceptable charging mode. In summary, the hub of the present invention can appropriately distribute the electric power to the electronic device 7 and the mobile device 8, so the charging time of the mobile device 8 is not prolonged. In addition, the hub of the present invention does not use a high-power power supply. Therefore, the manufacturing cost and the size of the hub can be reduced.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A hub, suitable for electrically connecting an electronic device, an AC power supply and at least one mobile device that are located outside the hub, the hub comprising:
   a power module, electrically connected to the AC power supply;
   a USB connection terminal, electrically connected to the power module and the mobile device;
   a USB Type-C connection terminal, electrically connected to the power module and the electronic device;
   a power distribution control circuit, electrically connected to the power module, the power distribution control circuit being used for measuring a measurement value of the power module; and
   a first power delivery controller, connected between the USB Type-C connection terminal and the power distribution control circuit;
   wherein, when the measurement value is not less than a measurement upper limit value, the power distribution control circuit decreases a charging power of the electronic device via the first power delivery controller.

2. The hub as claimed in claim 1, wherein when the measurement value is less than a measurement lower limit value, the power distribution control circuit increases the charging power of the electronic device via the first power delivery controller.

3. The hub as claimed in claim 1, wherein the power module includes an AC/DC converter and a first DC/DC converter, the AC/DC converter is electrically connected to the first DC/DC converter and the USB Type-C connection terminal, and the first DC/DC converter is electrically connected to the USB connection terminal.

4. The hub as claimed in claim 1, wherein the power module includes an AC/DC converter, a first DC/DC converter and a second DC/DC converter, the AC/DC converter is electrically connected to the first DC/DC converter and second DC/DC converter, the first DC/DC converter is electrically connected to the USB connection terminal, and the second DC/DC converter is electrically connected to the USB Type-C connection terminal.

5. The hub as claimed in claim 4, wherein the hub is suitable for electrically connecting a DC power supply located outside the hub, and the DC power supply is electrically connected to the first DC/DC converter and the second DC/DC converter.

6. The hub as claimed in claim 2, wherein the measurement value is an electric power value, a voltage value, a current value, or a temperature value.

7. The hub as claimed in claim 6, wherein when the measurement value is the electric power value, the measurement upper limit value is 60 W, and the measurement lower limit value is 52.5 W.

8. The hub as claimed in claim 6, wherein when the measurement value is the voltage value, the measurement upper limit value is 20V.

9. The hub as claimed in claim 6, wherein when the measurement value is the current value, the measurement upper limit value is 3 A.

10. The hub as claimed in claim 6, wherein when the measurement value is the temperature value, the measurement upper limit value is 75° C.

11. The hub as claimed in claim 1, further comprising a charging mode controller, the charging mode controller being connected between the USB connection terminal and the power distribution control circuit; wherein, when the measurement value is not less than the measurement upper limit value, the power distribution control circuit decreases a charging power of the mobile device via the charging mode controller.

12. The hub as claimed in claim 1, further comprising a second power delivery controller, the second power delivery controller being connected between the USB connection terminal and the power distribution control circuit; wherein, when the measurement value is not less than the measurement upper limit value, the power distribution control circuit decreases a charging power of the mobile device via the second power delivery controller.

\* \* \* \* \*